(12) United States Patent
Toyama et al.

(10) Patent No.: US 6,741,756 B1
(45) Date of Patent: May 25, 2004

(54) SYSTEM AND METHOD FOR ESTIMATING THE ORIENTATION OF AN OBJECT

(75) Inventors: Kentaro Toyama, Redmond, WA (US); Ying Wu, Champaign, IL (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/408,745

(22) Filed: Sep. 30, 1999

(51) Int. Cl.[7] ................................................. G06K 9/36
(52) U.S. Cl. ...................................... 382/291; 382/159
(58) Field of Search ............................... 382/100, 117, 382/118, 115, 156, 159, 160, 168, 190, 195, 199, 209, 216, 263, 266, 285, 289, 291, 296, 298; 345/649; 706/16, 20

(56) References Cited

U.S. PATENT DOCUMENTS

| | | | | |
|---|---|---|---|---|
| 5,404,426 A | * | 4/1995 | Usami et al. ............... | 345/420 |
| 5,459,636 A | * | 10/1995 | Gee et al. ..................... | 706/20 |
| 5,850,470 A | * | 12/1998 | Kung et al. .................. | 382/157 |
| 6,044,168 A | * | 3/2000 | Tuceryan et al. ........... | 382/118 |
| 6,111,983 A | * | 8/2000 | Fenster et al. .............. | 382/203 |
| 6,154,559 A | * | 11/2000 | Beardsley .................... | 382/103 |
| 6,188,776 B1 | * | 2/2001 | Covell et al. ............... | 382/100 |
| 6,301,370 B1 | * | 10/2001 | Steffens et al. ............. | 382/103 |

OTHER PUBLICATIONS

Park, H–S et al: "A truly 2–D hidden Markov model for off–line hnadwritten character recognition" Pattern Recognition, US Pergamon Press Inc. Elmsford, NY, vol. 31, No. 12 Dec. 1, 1998, pp. 1849–1964.

Rowley, H.A., S. Baluja and T. Kanade, "Neural network––based face detection", in IEEE Transactions on Pattern Analysis and Machine Intelligence, vol. 20, No. 1, pp. 23–38, Jan. 1998.

Schoedl, A., A. Haro, and I.A. Essa. Head tracking using a textured polygonal model. In Proc. Wkshp on Perceptual UI, pp. 43–48, 1998.

Stiefelhagen, R., J. Yang, and A. Waibel. Tracking eyes and monitoring eye gaze. In Proc. Wkshp on Perceptual UI, Baff, Canada, 1997.

Tao, H. and T.S. Huang. Bezier volume deformation model for facial animation and video tracking. In Proc. IFIP Workshop on Modeling and Motion Capture Techniques for Virtual Environments (CAPTECH'98), Nov. 1998.

Toyama, K. 'Look Ma, no hands!' Hands–free cursor control with real–time 3D face tracking. In Workshop on Perceptual User Interfaces 1998.

(List continued on next page.)

Primary Examiner—Bhavesh M. Mehta
Assistant Examiner—Kanji Patel
(74) Attorney, Agent, or Firm—Lyon & Harr, LLP; Katrina A. Lyon

(57) ABSTRACT

The present invention is embodied in a system and method for automatically estimating the orientation or pose of an object, such as a human head, from any viewpoint and includes training and pose estimation modules. The training module uses known head poses for generating observations of the different types of head poses and the pose estimation module receives actual head poses of a subject and uses the training observations to estimate the actual head pose. Namely, the training module receives training data and extracts unique features of the data, projects the features onto corresponding points of a model and determines a probability density function estimation for each model point to produce a trained model. The pose estimation module receives the trained model and an input object and extracts unique input features of the input object, projects the input features onto points of the trained model and determines an orientation of the input object that most likely generates the features extracted from input object.

41 Claims, 8 Drawing Sheets

OTHER PUBLICATIONS

Abowd, G.D. Classroom 2000: An experiment with the instrumentation of a living educational environment. IBM Systems Journal, Nov. 1999.

Basu, S., I. Essa, and A. Pentland. Motion regularization for model–based head tracking. In Proc. Int'l Conf. on Patt. Recog., 1996.

Cascia, M.L., J. Isidoro, and S. Sclaroff. Head tracking via robust registration in texture map images. In Proc. Computer Vision and Patt. Recog., 1998.

Chen, Q. H. Wu, T. Fukumoto, and M. Yachida. 3D head pose estimation without feature tracking. In Proc. Int'l Conf. on Autom. Face and Gesture Recog., pp. 88–93, 1998.

Cootes, T., G. Edwards, and C. Taylor, "Active Appearance Models," ECCV pp. 484–498, 1998.

DeCarlo D., and D. Metaxas. The integration of optical flow and deformable models with applications to human face shape and motion estimation. In Proc. Computer Vision and Patt. Recog., pp. 231–238, 1996.

Elagin, E., J. Steffens, and H. Neven. Automatic pose estimation system for human faces based on bunch graph matching technology. In Proc. Int'l Conf. on Autom. Face and Gesture Recog., pp. 136–141, 1998.

Gee, A. and R. Cipolla. Fast visual tracking by temporal consensus. Image and Vision Computing, 14(2):105–114, Mar. 1996.

Gong, S., S. McKenna, and J. J. Collins. An investigation into face pose distributions. In Proc. Int'l Conf. on Autom. Face and Gesture Recog., pp. 265–270, 1996.

Heinzmann, J. and A. Zelinsky. Robust real–time face tracking and gesture recognition. In Int'l Joint Conf. Artificial Intelligence 97, pp. 1525–1530, 1997.

Isard, M., and A. Blake. Contour tracking by stochastic propagation of conditional density. *Proc. ECCV 1996*.

Jebara, T.S., and A. Pentland. Parameterized structure from motion for 3D adaptive feedback tracking of faces. In Proc. Computer Vision and Patt. Recog., 1997.

Maurer, T. and C. von der Malsburg. Tracking and learning graphs and pose on image sequences of faces. In Proc. Int'l Conf. on Autom. Face and Gesture Recog., pp. 176–181, 1996.

McKenna, S.J. and S. Gong. Real–time face pose estimation. Real–Time Imaging, GB, Academic Press Limited vol. 4, No. 5, Oct. 1, 1998, pp. 333–347.

Niyogi, S. and W.T. Freeman. Example–based head tracking. In Proc. Int'l Cong. On Autom. Face and Gesture Recog., pp. 374–377, 1996.

Pappu, R. and P. Beardsley. A qualitative approach to classifying gaze direction. In Proc. Int'l Conf. on Autom. Face and Gesture Recog., pp. 160–165, 1998.

\* cited by examiner

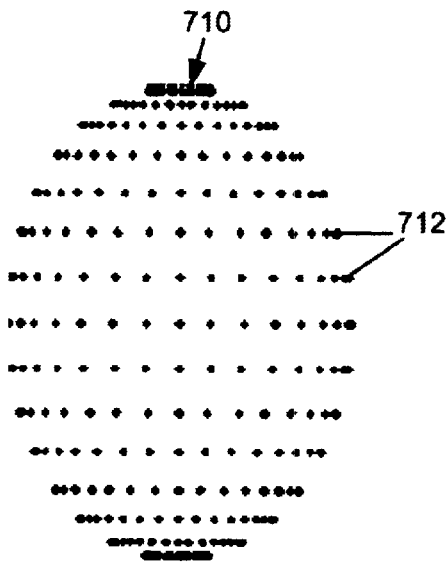
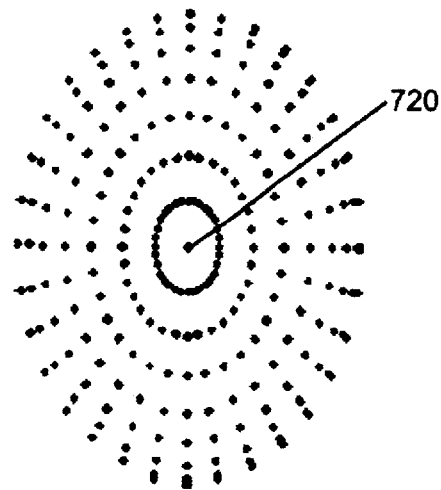
FIG. 7A      FIG. 7B
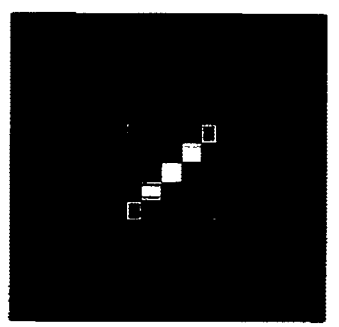
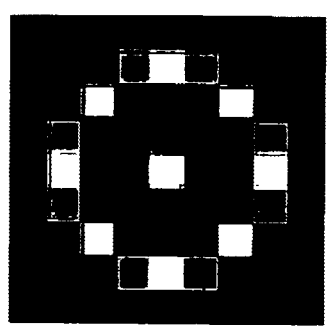
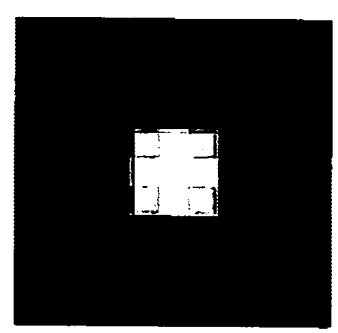
FIG. 8A      FIG. 8B      FIG. 8C

SYSTEM AND METHOD FOR ESTIMATING THE ORIENTATION OF AN OBJECT

BACKGROUND OF THE INVENTION

1. Field of the Invention

The present invention relates in general to object detection and tracking, and in particular to a system and method for estimating the orientation of an object.

2. Related Art

Facial gaze, i.e., the orientation of a person's head, gives cues about a person's intent, emotion, and focus of attention. As such, head orientation can play an important role in vision-based interfaces, where it can provide evidence of user action and lead to more detailed analysis of the face. A substantial part of facial image processing is concerned with determination of head pose. There are techniques based on tracking blobs of color, tracking particular facial features, tracking point features, following optic flow, and fitting textures.

Although many of these systems can be used for applications such as graphical avatar puppetteering and hands-free cursor control, they have constraints that limit them for other applications. For example, many of these systems are based on tracking image features or computing dense optic flow, and therefore require high-resolution images of the subject to succeed. Many systems also require significant restrictions on operation, such as per-user initialization, stable illumination conditions, or approximately frontal facial poses.

Some systems have attempted alternative approaches to overcome some of these limitations. One such system builds an ellipsoidal texture model of the head and determines pose by matching model projections to live images. This avoids dependency on high-resolution images and tracks the full range of orientations, but nevertheless requires initialization for each subject and static illumination conditions. Another system uses Gabor wavelet transforms. These systems take an "eigenface" approach to construct a linear image space of poses and use PCA-based techniques for representing pose changes. Because of the known limitations of PCA-based techniques for representing pose changes, it is not clear whether this system generalizes well to recovering more than the single rotational parameter that they consider. Yet another technique develops an example-based system which trains a neural network from example poses. However, pose estimation is treated as a brute-force recognition task and does not take advantage of known geometry. Lastly, another system uses elastic bunch graphs of wavelet feature vectors to determine head pose. Although this technique is relatively insensitive to person and illumination, it depends on good resolution.

Therefore, what is needed is a system for coarse head-orientation estimation that is insensitive to skin color, to glasses or facial hair, and to other common variations in facial appearance. What is also needed is a head orientation system that can handle large variations in illumination and side and back views. What is additionally needed is a head orientation system that works under a significant range of image scales and resolutions and does not require per-user initialization. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for automatically estimating the orientation or pose of an object, such as a human head, from any viewpoint. The system is insensitive to illumination changes and is applicable to people having varying appearances without requiring initialization for each user. In addition, the system and method of the present invention operates over a wide range of head orientations, such as, side and back views.

In general, the present invention is a system for estimating the orientation of an object and includes training and pose estimation modules. The training module receives training data and extracts unique features of the data, projects the features onto corresponding points of a model and determines a probability density function estimation for each model point to produce a trained model. The pose estimation module receives the trained model and an input object and extracts unique input features of the input object, projects the input features onto points of the trained model and determines an orientation of the input object that is most likely given the features extracted from input object. In other words, the training module uses known head poses for generating observations of the different types of head poses and the pose estimation module receives actual head poses of a subject and uses the training observations to estimate the actual head pose.

Specifically, the training module first builds a model of the head, such as a 3D ellipsoidal model, where points on the model maintain probabilistic information about local head characteristics. Any suitable characteristic can be used, but feature vectors based on edge density are preferred. Data is then collected for each point on the model by extracting local features from previously given annotated training images and then projecting these features onto the model. Each model point then learns a probability density function from the training observations. Once training is complete, the pose estimation module is then able to process new input images. The pose estimation module extracts features from input images, back projects these extracted features onto the model, and then finds the pose that is most likely given the current observation, preferably by using the maximum a posteriori criterion.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 7A–7B show ellipsoid object models.

FIGS. 8A–8C show exemplary convolution templates.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

The present invention is embodied in a system and method for estimating the orientation of an object, such as a head of a human body, from any viewpoint. The present invention handles dramatic changes in illumination, applies to many people without per-user initialization, and covers a wider range (e.g., side and back) of head orientations than previous system and methods.

In general, the present invention builds a model of the object, such as an ellipsoidal model for the human head and maintains probabilistic information about local head characteristics for points on the model. Any suitable characteristic can be used, but feature vectors based on edge density are preferred. To collect data for each point on the model, local features are extracted from training images and projected onto the model. Each model point learns a probability density function from the training observations. During pose estimation, features are extracted from input images, then, using the maximum a posteriori criterion, the system finds the pose that is most likely given the current observation.

The present invention works for wide-range, coarse head poses of the subject's approximate focus of attention. The present invention can be used in intelligent environments, for example where head pose estimation offers evidence of a user's communicative intent. The system could also be used for automated camera movement. In addition, since the present invention has user-independent quality, it can be used as an initializer of other pose tracking systems that often require an approximate initial estimate.

II. Exemplary Operating Environment

Figure 1:
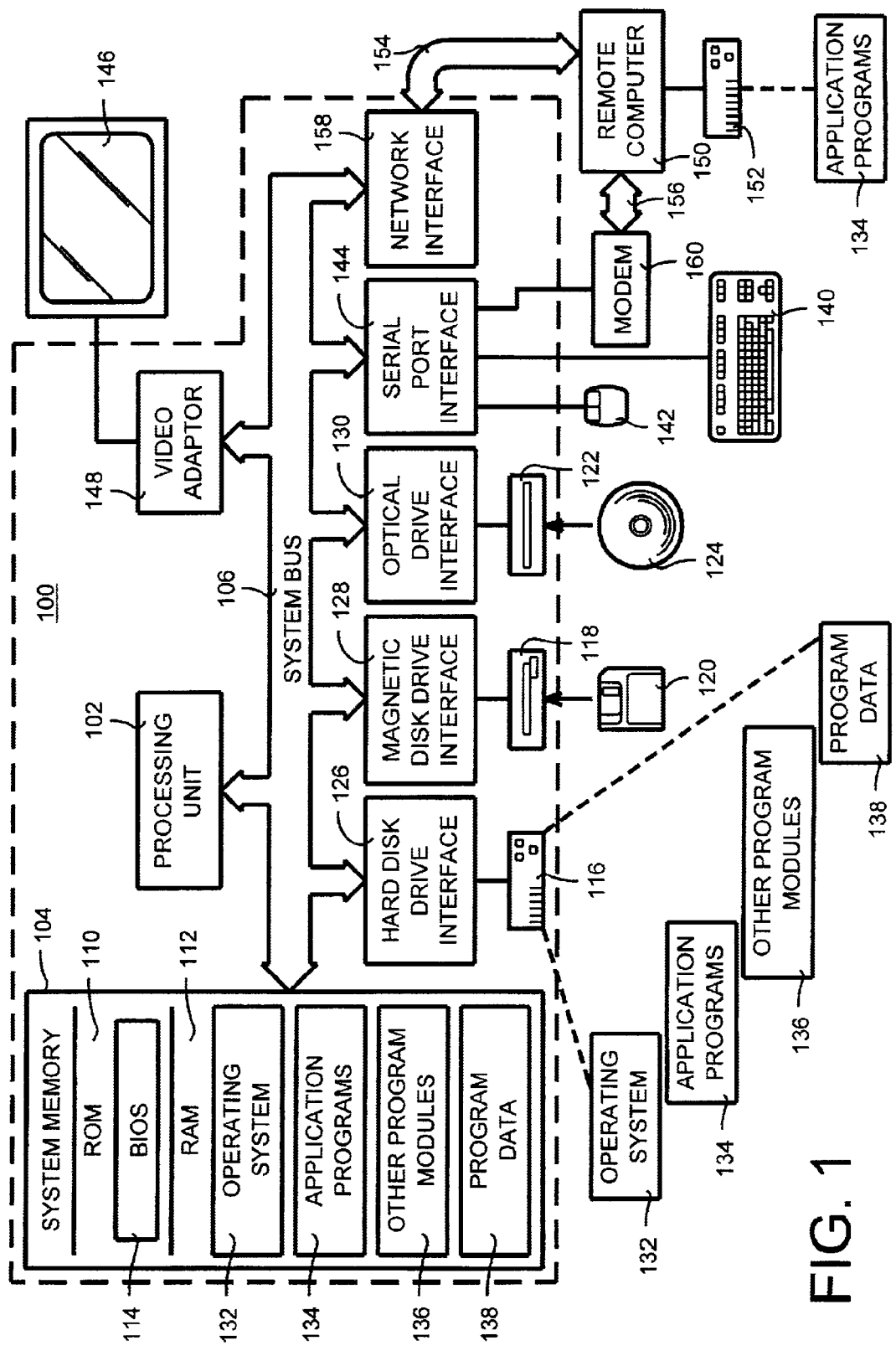
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

III. General Overview

Figure 2:
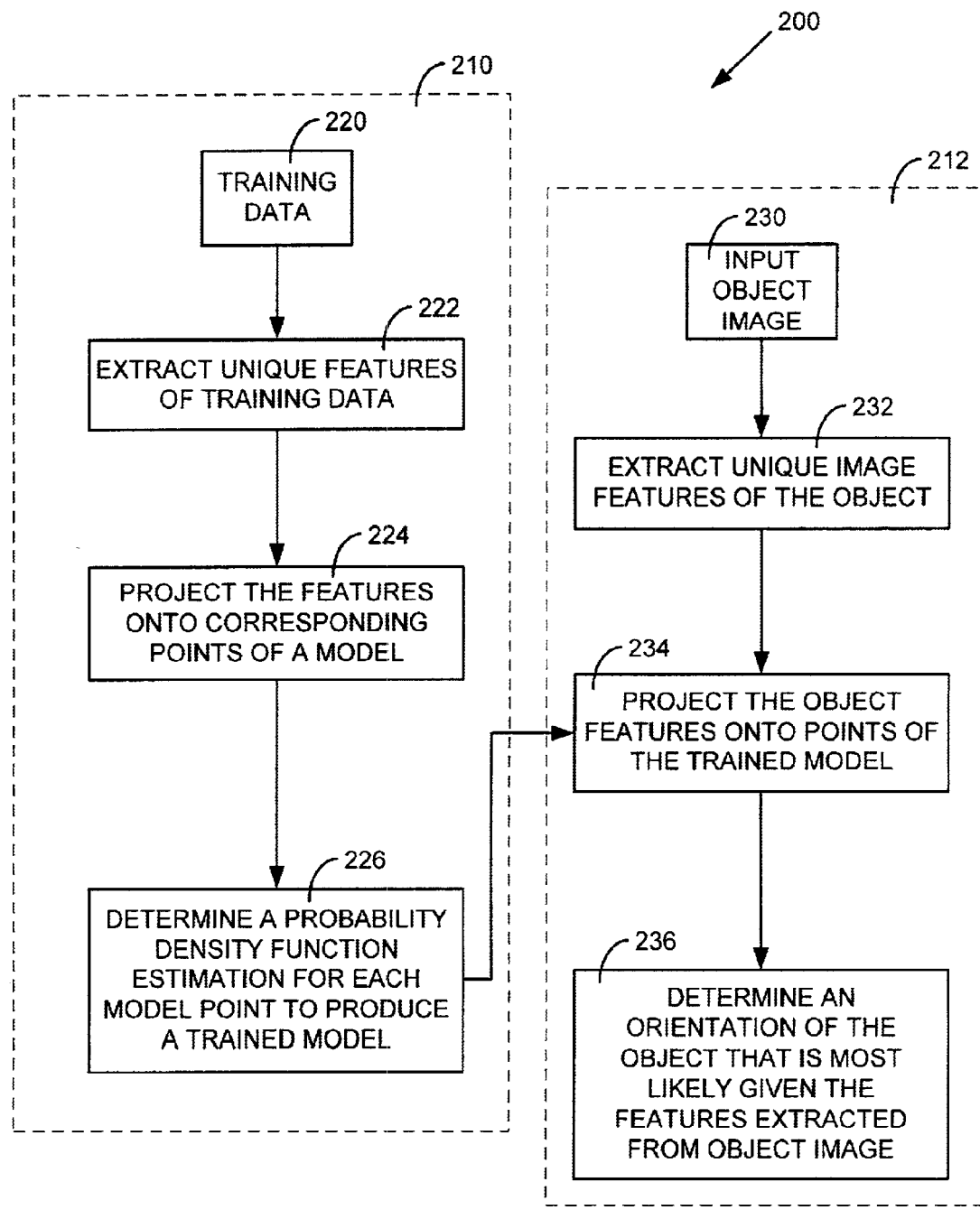
FIG. 2 is an overview flow diagram of the system and method of the present invention.

FIG. 2 is an overview flow diagram of the system and method of the present invention. In general, the system 200 of the present invention includes a training module 210 and a pose estimation module 212 for determining the orientation of an object. The training module 210 trains data (step 220) related to the object, extracts unique features of the training data (step 222), projects the features onto corresponding points of a pre-defined model (step 224), then determines a probability distribution density function estimation for each model point to produce a trained model (step 226). It should be noted that during implementation, the operations of the training module 210 need only be performed once to produce the trained model. Once the trained model is produced, it can be reused by the pose estimation module 212.

The pose estimation module 212 receives a digital representation of the object (step 230), extracts unique features of the object (step 232) and then projects the object features onto points of the trained model (234) after receiving the trained model from step 226. Last, the pose estimation module 212 determines an orientation of the object that most likely generates the features extracted from the object image (step 236).

Figure 3:
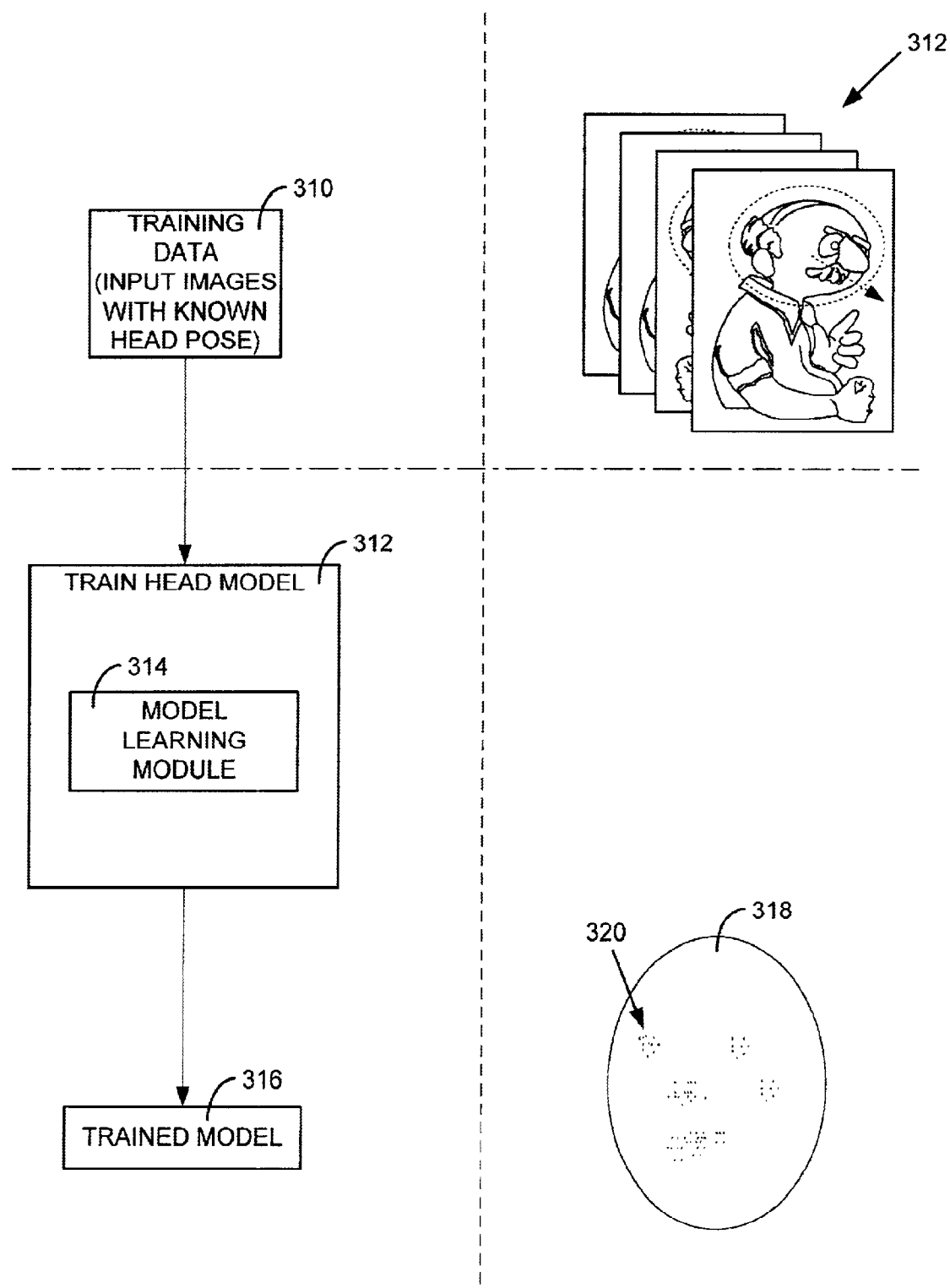
FIG. 3 is a general block diagram illustrating a system and method for training the head model for estimating human head orientation in accordance with the present invention.
Figure 4:
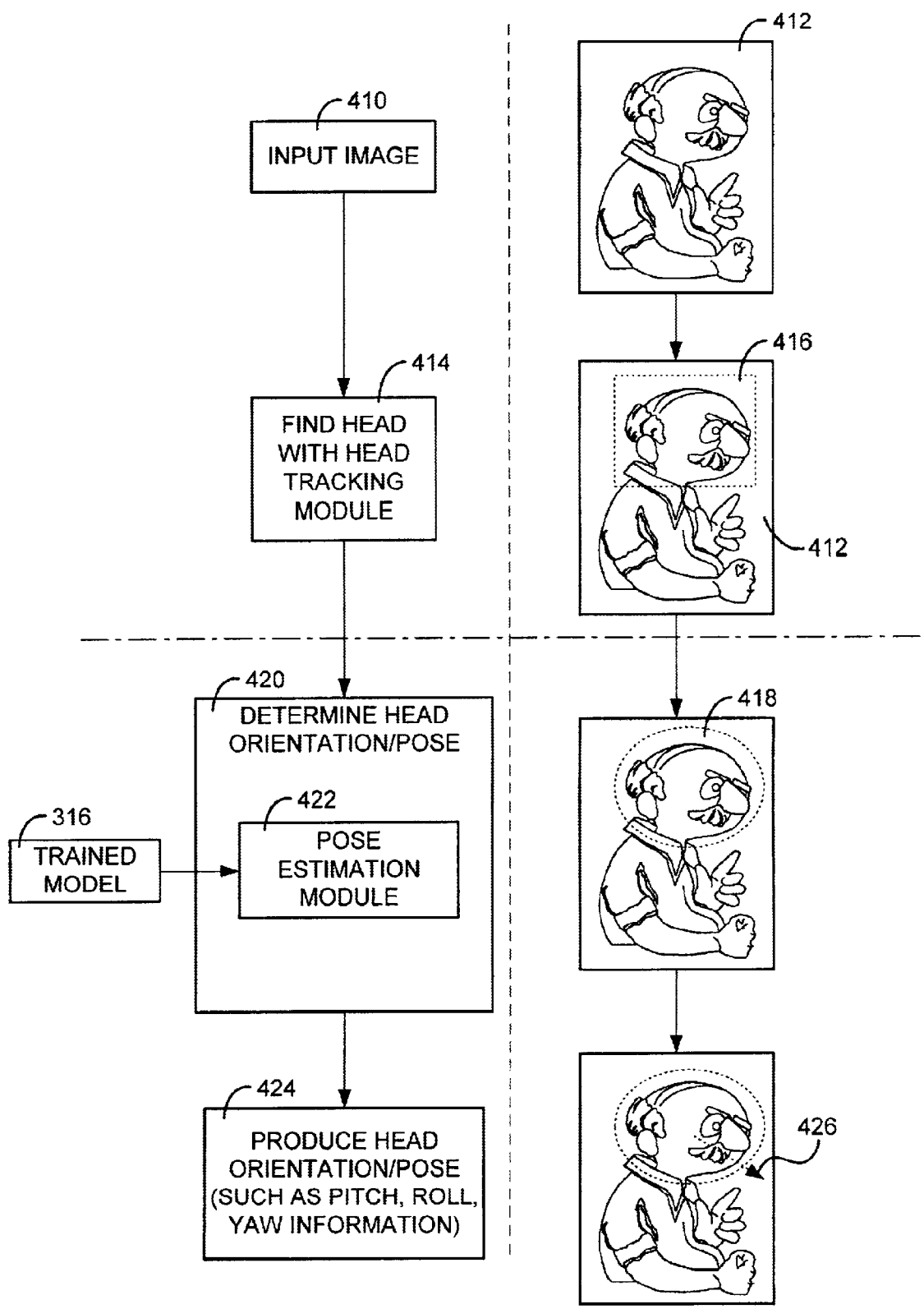
FIG. 4 is a general block diagram illustrating a system and method for estimating human head orientation/pose in accordance with the present invention.

Although the present invention can be used for determining the orientation of different types of objects, for illustrative purposes, FIGS. 3 and 4 show a system for determining human head orientation. Namely, FIG. 3 is a general block diagram illustrating a training module of FIG. 2 for training ahead model for estimating human head orientation in accordance with the present invention. FIG. 4 is a general block diagram illustrating a pose estimation module of FIG. 2 for estimating human head orientation/pose in accordance with the present invention.

As shown in FIG. 3, the training module 210 of FIG. 2 can be adapted to train data (step 310), such as images with known head orientations or poses 312, which can be human heads. A human head model is trained (step 312) with a model learning module 314 in accordance with steps 220–226 of FIG. 2 to produce a trained model 316, which can be an ellipsoid model 318 with head features 320.

For pose estimation, as shown in FIG. 4, first a digital representation of the object (step 410), such as an image or image sequence 412 of the object is received by the system. A head tracking module tracks the image and detects and isolates the object (step 414), such as a human head 416 of the image 412. Next, the orientation or pose of the head 418 is determined (step 420) by the trained model 316 of FIG. 3 and the pose estimation module 422, which is similar to pose estimation module 212 of FIG. 2, in accordance with steps 230–236 of FIG. 2. Last, human head orientation or pose coordinate information can be produced, such as the pitch, roll and yaw of the head (step 424) for mapping a digital coordinate based orientation or pose of the head as a graphical representation 426.

IV. Details of Components and Operation

Figure 5:
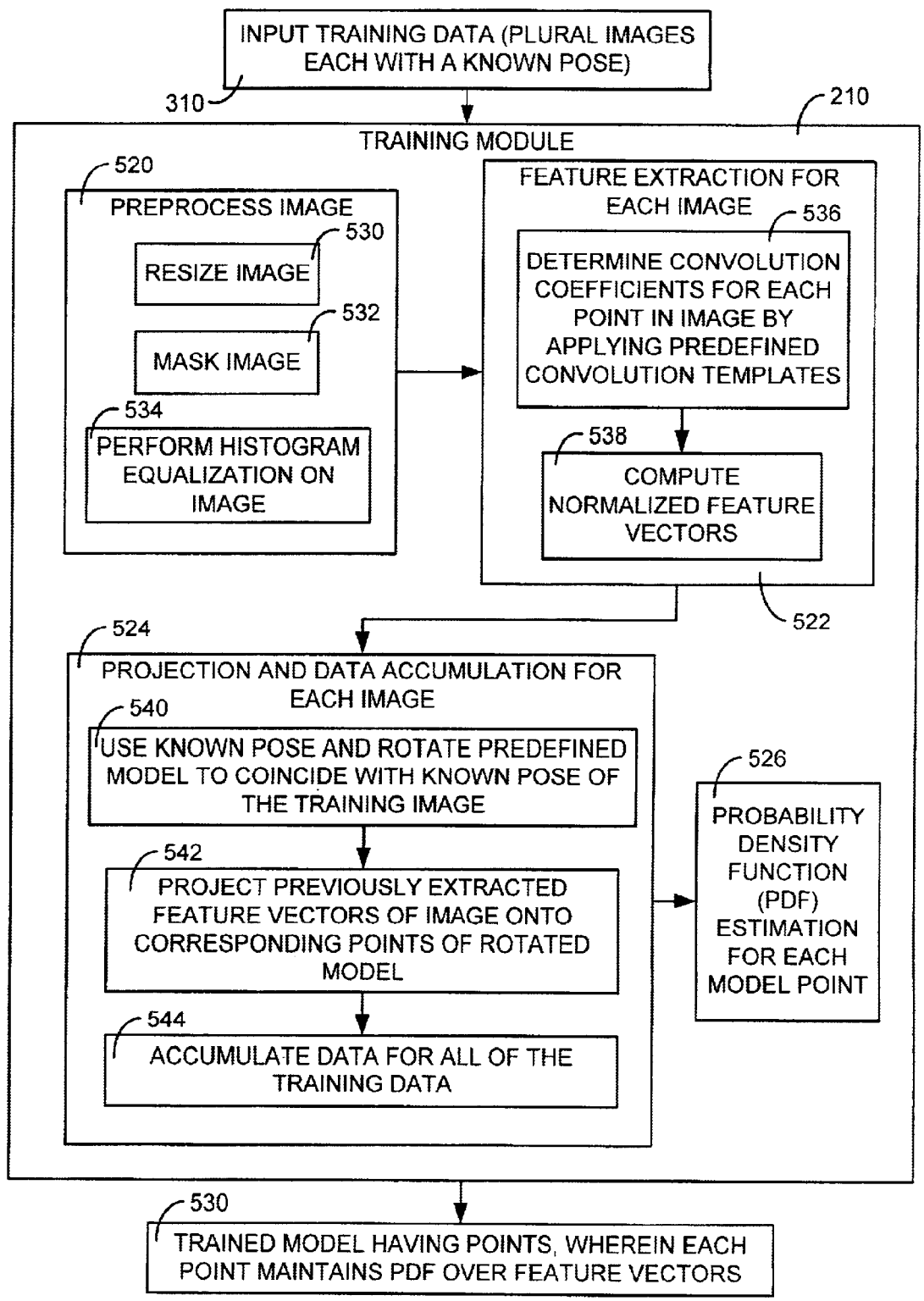
FIG. 5 is a detailed block diagram illustrating the training module of the present invention.

FIG. 5 is a detailed block diagram illustrating the training module of FIGS. 3–4 of the present invention. The training module 210 is adapted to receive training data (step 310). The training data can be suitable data of the object 230 of FIG. 2, such as digital images or an image sequence having known orientations or poses of the object 230. After the training data is received, the training module 210 preprocesses the data (step 520), which can be represented by images or image sequences, extracts features (step 522), such as feature vectors that are universal for a range of appearances of the object, insensitive to illumination and capable of distinguishing among different orientations, projects the data onto a model and accumulates data (step 524) and then estimates a pdf (step 526) to produce a trained model (step 530). It should be noted that the above steps can be performed in any suitable order.

Namely, the preprocessing step 520 can include resizing the images (step 530), masking the images to filter out unwanted background noise (step 532), performing histogram equalization on the images (step 534) or any other suitable image preprocessing steps that will enhance the images. The feature extraction step 522 includes determining image features at various points in the image. Although image features may include color information, statistical textural information, and so forth, the preferred method of feature extraction is to compute convolution coefficients for each point in the images by applying predefined convolution templates (step 536) and computing normalized feature vectors (step 538). The projection and data accumulation step 524 includes using known orientations or poses to rotate a predefined model (such as the models described above and the models described in working example below) to coincide with known orientations or poses of the training images (step 540), projecting previously extracted feature vectors of the images onto corresponding points of the rotated model (step 542) and accumulating data for all of the training data (step 544). Estimation of a probability density function (pdf) for each model point is then performed (step 526) to produce a trained model (step 530) that can be used by the pose estimation module 212 of FIG. 2 and FIG. 6.

Figure 6:
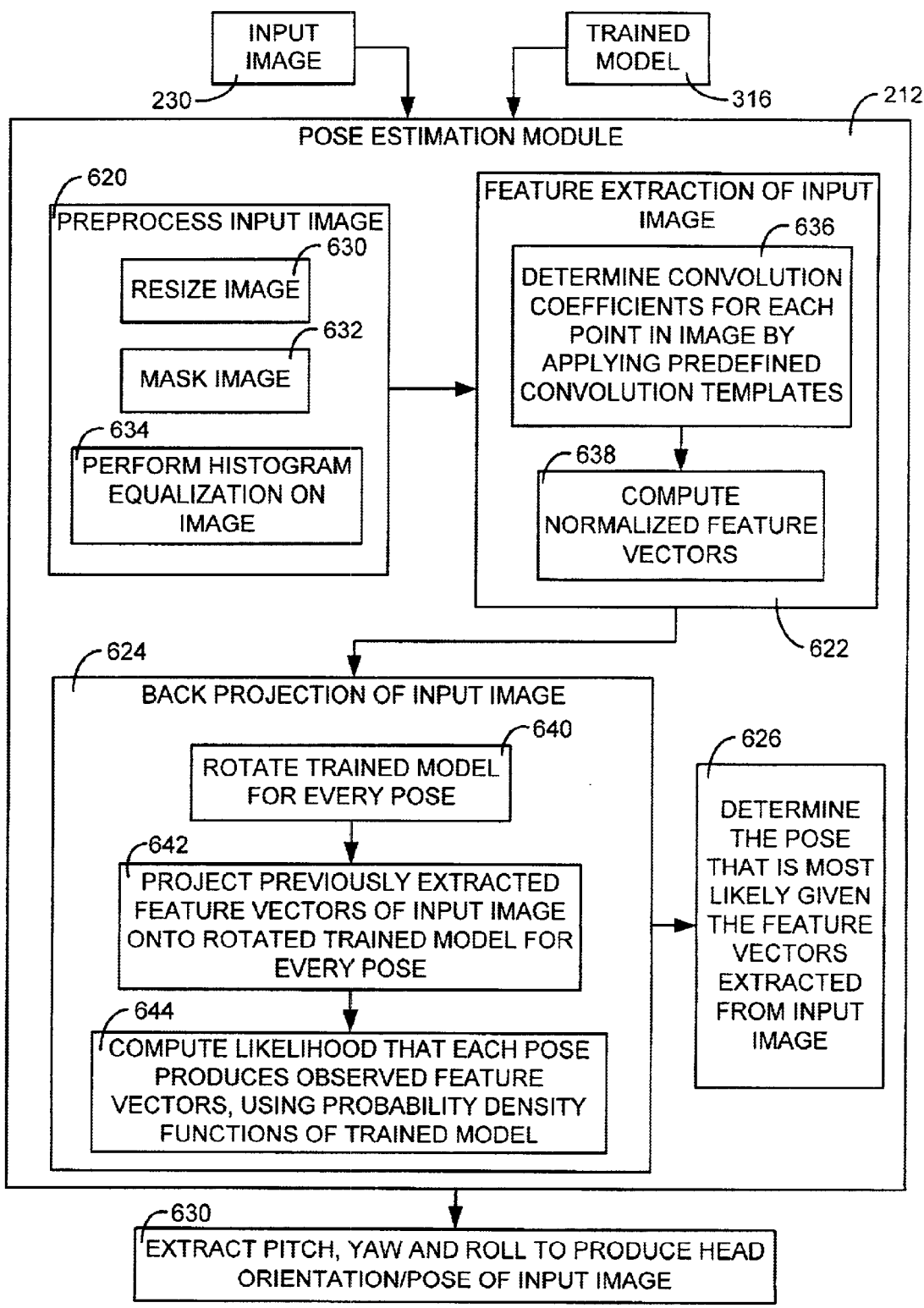
FIG. 6 is a detailed block diagram illustrating the pose estimation module of the present invention.
Figure 9A:
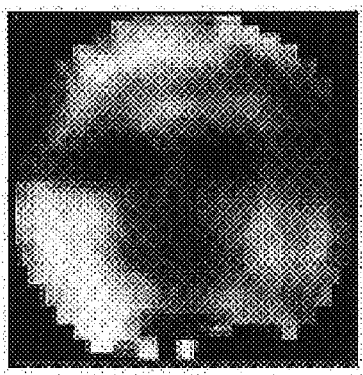
FIGS. 9A–9E show an example of a trained model.
Figure 9B:
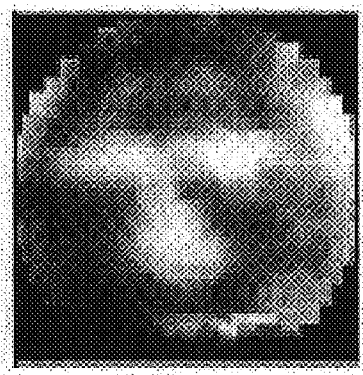
Figure 9C:
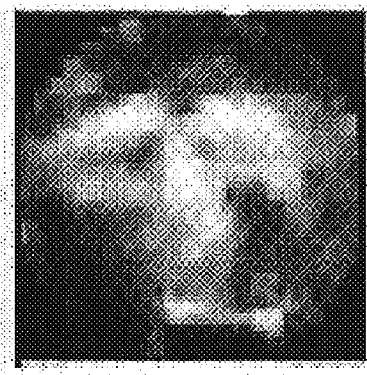
Figure 9D:
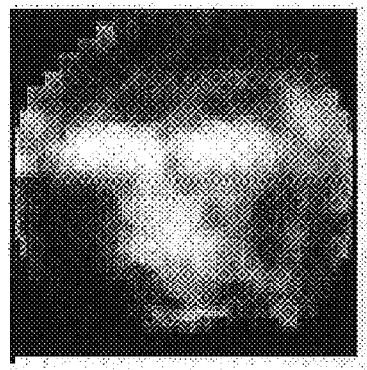
Figure 9E:
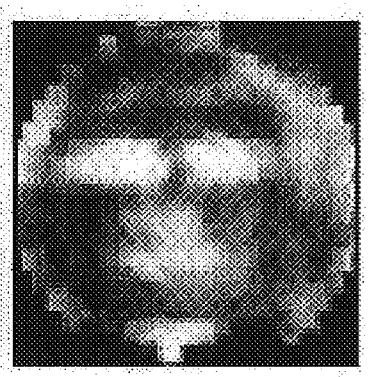

FIG. 6 is a detailed block diagram illustrating the pose estimation module of FIGS. 3–4 of the present invention. The pose estimation module 212 is adapted to receive digital data representing the object 230 of FIG. 2 to be analyzed as input data and the trained model 316. After the input data 230 and trained model 316 is received, the pose estimation module 316 preprocesses the input data (step 620), which can be represented by images or image sequences, extracts features of the input data (step 622), projects the input data onto trained model (step 624) and then determines the most likely pose (step 626) to extract information relating to the orientation or pose of the object (step 630). It should be noted that the above steps can be performed in any suitable order.

In particular, the preprocessing step 620 includes similar steps as the preprocessing step 520 of FIG. 5. Similar to step 522 of FIG. 5, the feature extraction step 622 includes determining convolution coefficients for each point in the input image by applying predefined convolution templates (step 636) and computing normalized feature vectors (step 638). The back projection step 624 includes rotating the trained model for every pose (step 640), projecting previously extracted feature vectors of the input image onto the rotated trained model for every pose (step 642) and computing the likelihood that each pose produces observed feature vectors using probability density functions of trained model (step 644). The pose that most likely generates the feature vectors extracted from the input image is determined from this computation (step 626). Last, pitch, yaw and roll information is extracted to produce coordinate orientation/pose of the input image. It should be noted that the trained model can be incrementally rotated and iteratively refined when comparing the feature vectors to aid in determining the pose that most likely generates the feature vectors extracted from the input image.

V. Working Example

The following working example is for determining orientation or pose of a human head and is provided for illustrative purposes only. In general, the system and method of the present invention first constructs a model of points, such as an ellipsoidal model, where each point maintains probability density functions (pdfs) of local image features of the human head based on training images. The features preferably capture local edge density, which is independent of each person and illumination. In addition, a preprocessing step can be used for both training images and input images for further diminishing the effects of illumination. A maximum a posteriori (MAP) estimation can then be used with different priors tailored for the cases of global pose estimation and pose tracking, respectively. It should be noted that in the working example described below, the training module preferably runs only once and does not need to be run again. This is because the estimation module is the device that is used during online execution and determination of head orientation or pose.

A. Initializations

1. Head Model

The head model is preferably an ellipsoid with a set of points on the surface, as shown in FIGS. 7A and 7B. Each point, indexed by i, is represented by its coordinates, $q_i$ (lying on the ellipsoid surface), and a pdf representing the belief probability $p_i(z|\theta)$, which is the belief that given at a particular pose, the point i will project observation z. The observations are local feature vectors extracted from the image. The model need not specify what features should be used. Several different placements of the model points can be used.

In one point distribution scheme, as shown in FIG. 7A, the points can be placed at intersections of regularly-spaced latitudinal and longitudinal lines. Namely, a "North pole" 710 coincides with the top of a human head. Longitudinal lines can be drawn every 10 degrees and latitudes at roughly every 11 degrees, for a total of 562 points 712. In another point distribution scheme, as shown in FIG. 7B, the point distributions are similar except that the point positions are rotated 90 degrees such that "North pole" 720 coincides with the nose of a human face.

The point distribution of FIG. 7B is preferred because it captures head information better for the purposes of pose estimation, since it has the greatest concentration of points at the front of the face. It should be noted that any suitable point distribution can be also be used, such as one that is specifically tailored for texture landscape of heads.

2. Features

The present invention does not require the use of any particular feature, but careful selection of features is an important component. Features which would be nearly universal (for a range of appearances), insensitive to illumination, and still able to distinguish among different orientations are preferred. At the same time, these features preferably do not depend on high-resolution imagery or nearly frontal poses. Some feature gathering information that can be used includes local color or brightness, precise facial-features found with detectors, features that are sensitive to local texture, etc.

However, local color or brightness information varies significantly depending on the person. Color is also highly variable under dramatic changes in illumination and color constancy remains a difficult problem, especially when illumination within an image itself varies. Next, the use of precise facial-feature detectors can cause problems since in severe lighting conditions and in low-resolution imagery, it is difficult to find the information to reliably detect an eye. As such, features that are sensitive to local texture are preferred.

For example, the feature vectors from the convolution of the following templates can be applied at each pixel with: 1) Gabor wavelets at 4 orientations and at 4 scales each; 2) Rotation-invariant Gabor "wavelets" at 5 different scales. Each template is the sum of 10 Gabor wavelets at 10 orientations such that the result is approximately rotationally symmetric; 3) A Gaussian at a coarse scale, and rotation-invariant Gabor templates at 4 scales; and 4) One Gaussian, and Laplacians at 4 scales.

Option 1 is not preferred because convolution coefficients for a given model point changed with orientation. The remaining options are rotationally invariant. FIGS. 8A–8C show exemplary convolution templates for detecting textural content. Options 2 (as shown in FIG. 8A), 3 (as shown in FIG. 8B) and 4 (as shown in FIG. 8C) can be used effectively, but option 3 is preferred. The rotation-invariant Gabor template appears to detect high-frequency texture, or edge density, as opposed to the Laplacian's tendency to emphasize existence of a single edge. Option 3 was used for the present working example. Also, because convolution output is strongly correlated with image brightness and contrast, a feature vector normalization is performed which effectively reduces that dependency. Although this eliminates one parameter from each feature vector, it improves performance.

3. Image Preprocessing

All of the training images and input images preferably undergo a preprocessing phase that scales the image, eliminates the background, and enhances contrast. For instance, first, given a cropped, rectangular image of a face, the image is rescaled to a 32×32 image using any suitable digital interpolation, such as bilinear interpolation. This step performs the scaling necessary for scaled orthographic registration of the head model with the image.

Next, a circular mask is applied to the image so that any background, non-head portions of the image are ignored. The mask is preferably conservative, with it diameter being 0:7×32 pixels. This reduces the possibility of including background pixels and also effectively bars those parts of the model which would undergo the most foreshortening from contributing to the training and estimation processes. Extreme foreshortening is a problem since it changes the aspect ratio of textures during projection. Last, the masked image is histogram equalized. Elimination of a linear brightness component from the image is avoided, since brightness variation is already handled by the normalization of model feature vectors.

B. Model Training

As described above in FIGS. 2–6, it is assumed that a set of annotated training data is given. In the working example, the annotation consists of a tight bounding box for the head and an estimate of the rotation matrix, R, that maps the head coordinate system to a camera coordinate system. Given a set of annotated images, training proceeds as follows. First, the image within the bounding box is pre-processed as described above in Section A.3. Second, normalized feature vectors are computed for each pixel as described above in Section A.2. Namely, Z is the concatenation of feature vector observations, $z_j$, which occur at coordinates $p_j=[x_j y_j]^T$ in the image. The feature vector $z_j$, contributes to the data collected for the model point $i_j^*$ that is the nearest neighbor to pj after orthographic projection:

$$i_j^* = \underset{i \in I}{\operatorname{argmin}} \|p_j - ORq_i\|2, \qquad (1)$$

where O is the matrix that projects $[xyz]^T$ to $[xy]^T$, and I is the set of model points, $\{i:(Rq_i).\hat{k}<0\}$, that could actually project to the image, assuming model opacity ($\hat{k}$ is a unit vector along the camera's optical axis).

Once all of the data is collected for each model point, i, the pdf for that point can be estimated. The pdf can be approximated with a single Gaussian whose mean and covariance coincide with the data. More precisely, $$p_{i_j^*}(z_j|\theta) = e^{-(1/2)(z_j - \bar{z}_{i_j^*})^T \Sigma_{i_j^*}^{-1}(z_j - \bar{z}_{i_j^*})}, \qquad (2)$$

where $$\bar{z}_{i_j^*} = \frac{\sum_{k \in D_{i_j^*}} z^k}{|D_{i_j^*}|},$$

$$\Sigma_{i_j^*} = \frac{\sum_{k \in D_{i_j^*}} (z^k - \bar{z}_{i_j^*})(z^k - \bar{z}_{i_j^*})^T}{|D_{i_j^*}|},$$

and k indexes the available data $D_{i_j}^*$ for point $_{i_j}^*$. This is consistent with a Bayesian approximation of the pdf with a low-information prior.

For instance, FIGS. 9A–9E show an example of a trained model, using data from 10 subjects. Edge density consistently distinguishes the eyes, nose, and mouth from the rest of the face. Namely, FIGS. 9A–9E represent the trained model after applying (A) a Gaussian, and (B-E) rotation-invariant Gabor masks, at 4 different scales. High intensity corresponds to high mean for the distribution at a model point.

C. Pose Estimation

Referring to FIGS. 2–6 along with FIGS. 9A–9E, the pose estimation is treated as a MAP in which the goal is to determine the most likely pose given the observation:

$$\theta^* = \underset{\theta}{\operatorname{argmax}}(\theta|z) = \underset{\theta}{\operatorname{argmax}} \frac{p(Z|\theta)p(\theta)}{p(Z)}, \qquad (3)$$

using Bayes' Rule. Since p(Z) is constant, the denominator in the right hand side can be ignored when computing $\theta^*$.

For global pose estimation, the prior is constant, further eliminating $p(\theta)$ from Equation 3. In this case, MAP estimation reduces to maximum likelihood (ML) estimation. Specifically, the pose that maximizes $$p(Z|\theta) \approx \prod_j p_{i_j^*}(z_j|\theta), \qquad (4)$$

is determined with the terms on the right hand side given by the trained model as in Equation 2. This is an approximation to the true probability.

For pose estimation in an online, continuous tracking situation, additional constraints creates a modification to this general approach. In particular, tracking often imposes a limit on computational processing. As such, below is a decimation of the search space is considered. Tracking also provides additional information due to spatio-temporal continuity. This can be incorporated this into the MAP framework by applying priors on $\theta$ that depend on earlier processing.

First, if computational resources are limited, Equation 4 preferably is not computed over the entire pose space. Because the approximate pose is component that is of interest, the search space can be coarsely discretized (equivalent to setting the prior in Equation 4 to be zero or a normalized constant, depending on $\theta$). Therefore, preferably only poses every 20 degrees of rotation about the vertical axis of the head are considered (corresponding to yaw), every 10 degrees about the axis through the ears (pitch), and +/−20 degrees or 0 degrees about the axis through the nose (roll).

Next, different priors for Equation 3 can be used. For example, the following can be used: 1) a constant prior ($p(\theta)=c$); 2) a Gaussian prior, with constant variance and mean at the previous pose estimate ($p(\theta_t)=N(\theta_{t-1},\bar{\Sigma})$); 3) the previous posterior as prior ($p(\theta_t)=p(\theta_{t-1}|Z_{t-1})$) with a trivial motion model. Other suitable prior models based on dynamic or predictive models of the pose can be used.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for estimating the orientation of an object comprising:
   providing a trained model of the object as training data, wherein the trained model of the object is produced by extracting unique features of the training data, projecting the features of the training data onto corresponding points of a model and determining a probability density function estimation for each model point;
   extracting unique features of an image representing the object;
   back projecting the features of the image onto points of the trained model; and
   determining an estimated orientation of the object that most likely generates the features extracted from object.

2. The method of claim 1, further comprising using a predictive prior to bias the estimation of orientation.

3. The method of claim 1, further comprising preprocessing the image.

4. The method of claim 3, wherein preprocessing the image includes resizing the image.

5. The method of claim 3, wherein preprocessing the image includes masking the image to filter out unwanted background noise.

6. The method of claim 3, wherein preprocessing the image includes performing histogram equalization on the image.

7. The method of claim 1 wherein extracting unique features includes determining convolution coefficients for each point in the image by applying predefined convolution templates.

8. The method of claim 1, wherein extracting unique features includes computing normalized feature vectors.

9. The method of claim 1, wherein extracting unique features includes determining dense occurrences of high-frequency components in local image regions.

10. The method of claim 9 wherein determining dense occurrences of high-frequency components in local image regions is performed with rotationally-invariant Gabor templates.

11. The method of claim 9 wherein determining dense occurrences of high-frequency components in local image regions with a Gaussian at a coarse scale.

12. The method of claim 9, wherein determining dense occurrences of high-frequency components in local image regions a single Gaussian and plural Laplacian templates.

13. The method of claim 1, wherein back projecting the features includes rotating the trained model.

14. The method of claim 13 wherein back projecting the features further includes projecting previously extracted feature vectors of the input image onto the rotated trained model.

15. The method of claim 14 wherein back projecting the features further includes computing a likelihood that each pose produces observed features using probability density functions of the trained model.

16. The method of claim 1, wherein projecting the features onto corresponding points of a predefined model includes using known orientations and rotating the predefined model to coincide with the known orientations.

17. The method of claim 16 wherein projecting the features onto corresponding points of a model includes projecting previously extracted features of the image onto corresponding points of the rotated model.

18. The method of claim 17 wherein projecting the features onto corresponding points of a model includes accumulating and storing data for plural images representing the object.

19. The method of claim 1 wherein the model is a three dimensional ellipsoidal model.

20. An orientation system for estimating the orientation of an object comprising a pose estimation module that receives a trained model of the object and an input object and extracts unique features of the input object, back projects the features onto points of the trained model and determines an orientation of the input object that most likely generates the features extracted from input object; and
wherein the estimation module uses a predictive prior to bias the output estimation of orientation.

21. The orientation system of claim 20, further comprising a training module that receives training data and extracts unique features of the training data, projects the features of the training data onto corresponding points of a model and determines a probability density function estimation for each model point to produce the trained model.

22. The orientation system of claim 21 wherein back projecting the features includes rotating the trained model.

23. The orientation system of claim 22, wherein back projecting the features further includes projecting previously extracted feature vectors of the input image onto the rotated trained model.

24. The orientation system of claim 23, wherein back projecting the features further includes computing a likelihood that each pose produces observed features using probability density functions of the trained model.

25. The orientation system of claim 21, wherein projecting the features onto corresponding points of a predefined model includes using known orientations and rotating the predefined model to coincide with the known orientations.

26. The orientation system of claim 25, wherein projecting the features onto corresponding points of the model includes projecting previously extracted features of the image onto corresponding points of the rotated model.

27. The orientation system of claim 20 wherein the model is a three dimensional ellipsoidal model.

28. The orientation system of claim 20, further comprising a preprocessing module capable of at least one of resizing the image, masking the image to filter out unwanted background noise and performing histogram equalization on the image.

29. The orientation system of claim 20 wherein the pose estimation module determines convolution coefficients for each point in the image by applying predefined convolution templates.

30. The orientation system of claim 20 wherein extracting unique features includes computing normalized feature vectors.

31. The orientation system of claim 20, wherein extracting unique features includes determining dense occurrences of high-frequency components in local image regions.

32. The orientation of system claim 31, wherein determining dense occurrences of high-frequency components in local image regions is performed with rotationally-invariant Gabor templates.

33. A method for determining the orientation of a head, comprising:
extracting unique features of training data representing different heads;
projecting the features of the training data onto corresponding points of a model;
determining a probability density function estimation for each model point;
extracting unique features of the head;
back projecting the features of the head onto points of the trained model; and
determining an estimated orientation of the head that most likely generates the features extracted from head.

34. The method of claim 33, further comprising using a predictive prior to bias the output determination of orientation.

35. The method of claim 33, wherein the model is a three dimensional ellipsoidal model.

36. The method of claim 33, further comprising determining convolution coefficients for each point in the head by applying predefined convolution templates.

37. The method of claim 33, wherein back projecting the features includes rotating the trained model, projecting previously extracted feature vectors of the input image onto the rotated trained model and computing a likelihood that each pose produces observed features using probability density functions of the trained model.

38. The method of claim 33, wherein projecting the features onto corresponding points of a predefined model includes using known orientations and rotating the predefined model to coincide with the known orientations and projecting previously extracted features of the image onto corresponding points of the rotated model.

39. The method system of claim 33, wherein extracting unique features includes computing normalized feature vectors.

40. The method of claim 33, wherein extracting unique features includes determining dense occurrences of high-frequency components in local image regions.

41. The method of system claim 40 wherein determining dense occurrences of high-frequency components in local image regions is performed with rotationally-invariant Gabor templates.

* * * * *